United States Patent [19]

LeCompte

[11] Patent Number: 5,123,608
[45] Date of Patent: Jun. 23, 1992

[54] PAYOUT TESTER OF A FILAMENT DISPENSER AND METHOD THEREFOR

[75] Inventor: George W. LeCompte, Tucson, Ariz.

[73] Assignee: Hughes Aircraft Company, Los Angeles, Calif.

[21] Appl. No.: 639,455

[22] Filed: Jan. 10, 1991

[51] Int. Cl.$^5$ .................. B65H 49/02; B65H 51/16
[52] U.S. Cl. ............................. 242/128; 242/1;
242/47; 242/54 R; 226/97
[58] Field of Search ............ 242/128, 54 R, 47, 1, 242/82, 83; 226/97

[56] References Cited

U.S. PATENT DOCUMENTS

| | | | |
|---|---|---|---|
| 3,667,092 | 6/1972 | Engels | 242/47 |
| 4,221,345 | 9/1980 | Schippers et al. | 242/47 |
| 4,326,657 | 4/1982 | Arpin et al. | 242/128 X |
| 5,018,678 | 5/1991 | Peterson | 242/47 |

*Primary Examiner*—Stanley N. Gilreath
*Attorney, Agent, or Firm*—R. M. Heald; C. D. Brown; W. K. Denson-Low

[57] ABSTRACT

An optical fiber (24) is removed from a wound pack (26) by applying an annular stream of pressurized air or other fluid against one or more filament loops previously taken from the pack. The annular stream is produced by passing pressurized air from a source (33) along a conduit (32) having a diverging tapered portion (35) within which a tapered plug (36) is located in spaced relation forming an annular nozzle (37). Filament (24) removed from the pack (26) is stacked on a tapered catcher (38).

14 Claims, 1 Drawing Sheet

PAYOUT TESTER OF A FILAMENT DISPENSER AND METHOD THEREFOR

BACKGROUND OF THE INVENTION

1. Field of the Invention

The present invention relates to testing of filaments on being dispensed from a wound pack, and, more particularly, to the testing of an optical fiber from a wound pack which is contemplated for use in a data link to determine tensile forces generated in the fiber during dispensing as well as bending stiffness.

2. Description of Related Art

Filaments, and especially optical fiber filaments, are used in certain applications such as in missiles, for example, as a data link in which a length of a filament is wound onto a dispenser bobbin located aboard the missile connected to apparatus carried by the missile, the other end of which is interconnected with on-site apparatus. At launch, the optical fiber is dispensed maintaining the link between the apparatus via an optical signal transmitted along the fiber. As the desired speed for dispensing increases and the fiber diameter becomes smaller, the manner of dispensing must be carefully chosen in order to avoid direct breakage of the fiber or even microbending which has been found to produce deterioration of the optical signal. Prior to installation of use of a given dispenser, it is therefore advisable to test the dispenser under facsimile conditions in order to determine that the stressing and bending limits are not exceeded for the fiber.

There are existing machines for performing such filament tests and it has been found advisable in performing such tests to pull the filament through a substantial distance (i.e. 50 feet or more) to allow damping of the payout helix. Where there is a fast moving filament, and this is the usual case in a dispenser of the kind referenced, there is a substantial aerodynamic drag during the filament pullout which adds an additional tension load to the filament beyond that which would normally be expected to occur during actual payout from a moving vehicle. Accordingly, it has been found necessary that after passing through the pulling device a new helix must be introduced to promote a controlled deceleration of the fiber. In explanation, uncontrolled deceleration results in high speed collisions of the loops that cause signal attenuation as well as actual fiber breakage. Still further, controlling the deceleration is increasingly difficult as the filament diameter becomes less because of the corresponding decrease in bending stiffness.

One known present day apparatus for use in testing dispensing of a fiber optic cable is referred to as a pneumatic shoe capstan which establishes an air bearing having a groove within which a cushion of pressurized air is emitted for supporting the fiber optic cable located therein. The fiber optic cable can be pulled through the air bearing groove without effecting direct physical contact of the fiber with a material surface which considerably reduces the frictional drag that would be encountered with a conventional pulley. Although this known apparatus offers a substantial improvement over conventional frictional engagement apparatus, the problem of deceleration must be met successfully in order to prevent damage to the fiber. This requires additional equipment which is expensive. Also, having to pull the filament through a substantial distance poses a problem of aerodynamic drag which adds a tension load exceeding the expected performance requirements.

SUMMARY OF THE INVENTION

The helix of an optical fiber taken off a wound bobbin is intercepted by an annular stream of pressurized gas centered on the central axis of the dispensed helix which serves as the essential filament dispensing force. An increase in dispensing speed in the direction of the annular pressurized gas flow reduces the filament helix. By appropriate adjustment of the helix size payout speed for the fiber, the annular gas plume effects centrifugal expansion ("blooming") of the fiber helix which eliminates a substantial amount of the tension increase found to occur during helix damping. The supply line for the pressurized air extends further outwardly in the same direction as that of the pressurized annular stream of air and serves as a catcher for the spent filament as it is slowed by air drag after leaving the high velocity region of the air stream jet.

DESCRIPTION OF A PREFERRED EMBODIMENT

Figure 1:
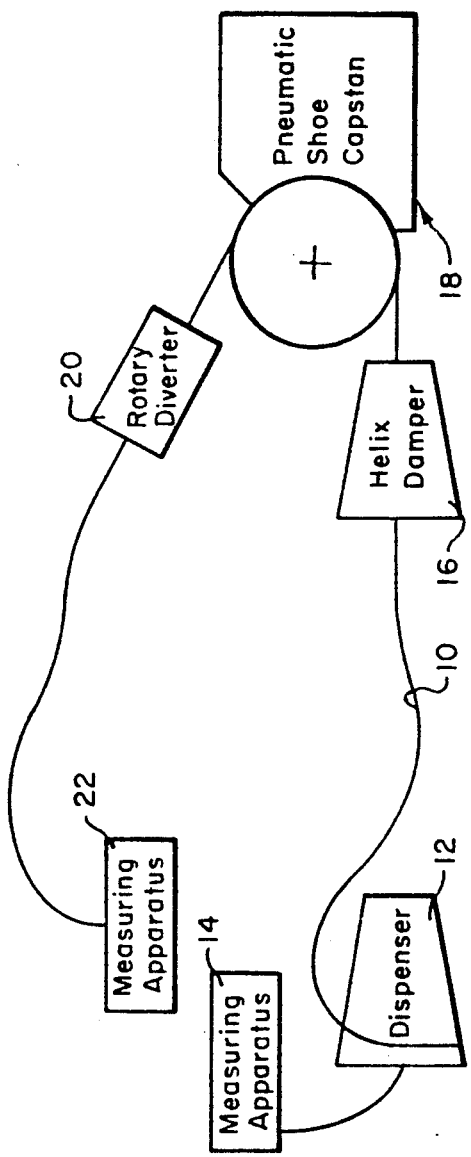
FIG. 1 shows a prior art optical fiber tester utilizing a pneumatic shoe capstan.

FIG. 1 of the drawing shows a well accepted prior art system for testing the dispensing of an optical fiber apparatus. A length of optical fiber 10 is wound onto a dispenser 12 which is shown as a conventional dispenser having a cylindrical tapered shape, it being contemplated that the fiber will be taken off the small end of the dispenser in a direction generally parallel to the dispenser axis. The end of the fiber that is to stay at the dispenser is interconnected with suitable light signal generating and measuring apparatus 14. The fiber on being removed from the dispenser 12 moves along a path a substantial distance, preferably at least 50 feet, where it is received into a helix damper 16 which can be simply a hollow cone with the large orifice end facing the dispenser and the smaller opening end facing away from the dispenser. The damper serves to reduce the diameter of the helix of the dispensed fiber before it is received within the pneumatic shoe capstan enumerated generally as 18. Essentially, the capstan 18 includes an elongated groove of preferred configuration for receiving the fiber as it leaves the helix damper and moving it along a different direction to a rotary diverter 20 which provides the dispensing action to the fiber drawing off the dispenser 12. The capstan 18 operates by having a pressurized source of air fed into the bottom of the bearing groove supporting the fiber on a cushion of air and in that avoiding frictional engagement of the fiber with a solid surface. The outer end of the fiber 10 is interconnected to a further set of signal measuring apparatus 22.

In use of the prior art system, the rotary diverter initiates dispensing of the fiber 10 from the dispenser 12 along the path through the helix damper, through the pneumatic shoe capstan and to the rotary diverter. During this motion of the dispensing fiber, electrical measurements are taken of the light signal being passed through the data link established by the fiber 10 and also stressing of the fiber is measured at the rotary diverter.

Although this prior art system is effective and has many excellent attributes, it requires relatively complicated apparatus for its operation and adds a further tension load onto the device beyond what would actually occur in real time payout from a moving vehicle as a result of aerodynamic drag in the helix damper.

Figure 2:
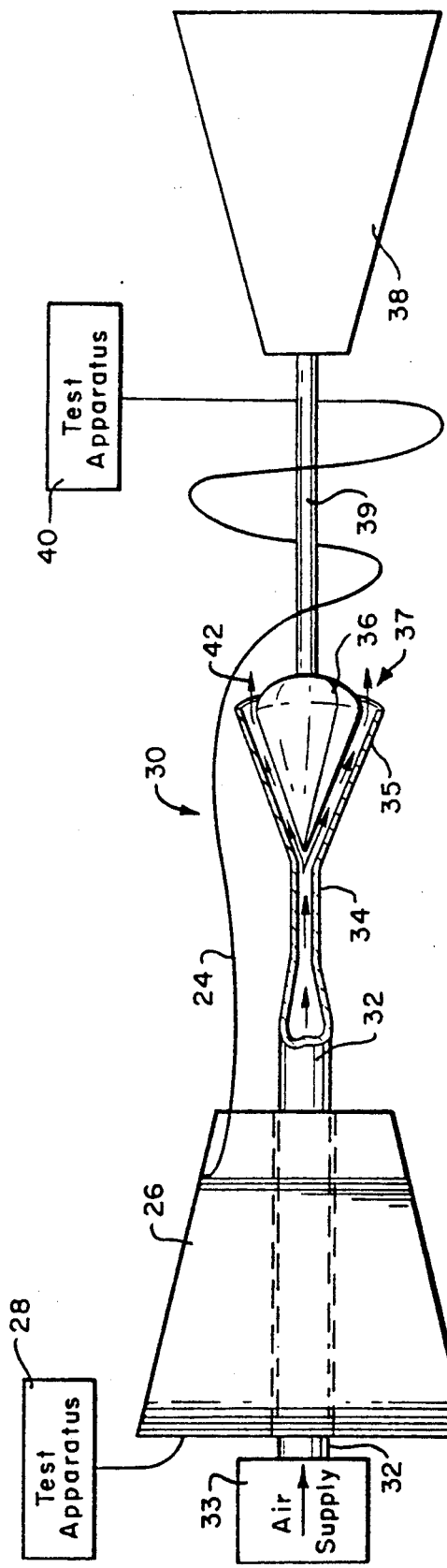
FIG. 2 shows side elevational, partly schematic view of a payout tester of the present invention.

FIG. 2 shows, partially in schematic form, a system of the present invention for testing the dispensing of a fiber cable 24 which has been wound onto a tapered stationary dispenser 26. The fiber and dispenser can be identical to the fiber 10 and dispenser 12 of the prior art apparatus. One end of the fiber cable is interconnected to apparatus 28 which serves the same purpose as the apparatus 14 in the first described prior art operation. An annular fluid jet generating apparatus 30 includes an elongated pipe or conduit 32 which passes through the dispenser 26 and extends substantially along the dispenser axis. The outer end of conduit 32 is connected to a supply 33 of pressurized air and the other end conduit end portion tapers down to a restricted cross-section portion 34 and then diverges to an enlarged tapering portion 35. A tapered plug 36 has dimensions such that it can be located within the tapered portion 35 and spaced slightly from the outlet walls forming an annular nozzle 37. A tapered fiber catcher 38 is centered on the conduit axis and interconnected with the tapered plug 36 via a cylindrical, smooth surfaced rod 39.

In test operation, the fiber cable 24, with its outer end connected to apparatus 40 which can be identical to apparatus 22, initially has several loops formed about the rod 39. Pressurized air is then admitted to the conduit 32 and it exits from the annular outlet or nozzle 37 as a cylindrical stream 42 of fluid (e.g. air) which moves over the surface of the conduit in the direction of the arrows toward the catcher 38. The cylinder of air 42 contacts the fiber cable 24 both moving it along with it and simultaneously causing the helix of the cable to expand. The movement continues until the helical loops of the fiber reach the catcher 38 at which point the force of the air jet is substantially dissipated and the fiber loops are now received onto the catcher preventing them from being damaged or forcefully interacting with each other which could deteriorate signals being sent along the fiber cable data link.

More particularly, as the fluid jet moves along the conduit towards the catcher, it expands in cross-section which reduces the fluid velocity and results in the fiber decelerating without losing its overall helical shape. High-efficiency transfer of energy from the fluid jet to the fiber cable is achieved because of the relatively large angle of attack between the cable local elements and the fluid velocity vector. Also, self-regulation is achieved by centrifugal expansion of the cable helix which tends to move it outward in the jet to a region of lower fluid velocity.

The described invention is especially advantageous in testing optical fiber cables that are dispensed at high velocities and where the diameter of the fiber cable is relatively small. Since the described system does not frictionally engage the fiber cable, it does not impose additional stress beyond that which would normally be experienced in actual use, and automatically stores the substantial length of fiber that is dispensed during the test without microbending or damaging the fiber through high speed collision of the helical loops.

The term "fluid" as used herein is considered to preferably include pressurized air, however, it is also believed that the application could be advantageously utilized where the fluid consisted of a pressurized liquid, such as water, for example.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. A system for applying a force to a filament to remove the filament from a wound pack on a bobbin, comprising:
   conduit means for passing a pressurized fluid and for receiving at least one loop of filament from the wound pack thereabout; and
   nozzle means on an end of said conduit means for directing the fluid against the at least one filament loop and removing said filament from the wound pack.

2. A system as in claim 1, in which the conduit means includes a first portion of prescribed cross-sectional dimensions interconnected with a source of supply of pressurized fluid and a further portion interconnected with said first portion, said further portion having lesser cross-sectional dimensions than said first portion, and the nozzle means connected to the further portion.

3. A system as in claim 2, in which the fluid is air.

4. A system as in claim 1, in which there is further provided a tapered catcher against which the at least one filament loop is moved by the pressurized fluid.

5. A system as in claim 1, in which the nozzle means is annular shaped and directs a generally cylindrical stream of pressurized fluid against the at least one loop and away from the bobbin so as to pull the filament from the wound pack.

6. A system as in claim 5, in which the conduit means is generally straight-line and has two ends, and the nozzle means is secured to one end of the conduit means and the pressurized fluid source of supply is connected at the other end of the conduit means.

7. A system as in claim 1, in which the fluid is water.

8. A system as in claim 1, in which the filament is an optical fiber.

9. A system as in claim 1, in which the nozzle means includes a diverging tapering portion interconnected with the conduit means, and a tapered plug received within the diverging tapering portion and spaced therefrom forming an annular outlet for pressurized fluid from the conduit means.

10. A system as in claim 9, in which a tapered catcher is interconnected with the plug by a rod to receive filament that is removed from the wound pack.

11. A system as in claim 1, in which the conduit means extends through the bobbin.

12. 12. A method of removing a filament from a wound pack without unduly stressing or damaging the filament, comprising the steps of:
   forming at least one helical loop of the filament from a filament portion removed from the wound pack;
   passing a stream of pressurized fluid through a conduit spaced apart from the filament, wherein the conduit ends in an annular nozzle;
   directing an annular fluid stream from the nozzle at a relatively large angle of attack against the at least one helical loop and away from the wound pack to rapidly pull helices of filament from the wound pack; and expanding the cross-section of the helicies of filament moving with the fluid stream; thereby rapidly decelerating the velocity of the filament without losing the overall helical shape of the filament.

13. A method as in claim 12, including the further step of stacking filament pulled from the wound pack onto a tapered surface.

14. A method as in claim 12, in which the fluid annular stream is directed along a line substantially coextensive with the axis about which the pack is wound.

* * * * *